United States Patent [19]

Gaggermeier

[11] Patent Number: 4,989,708
[45] Date of Patent: Feb. 5, 1991

[54] MULTI-DISK FRICTION CLUTCH

[75] Inventor: Helmut Gaggermeier, Friedrichshafen, Fed. Rep. of Germany

[73] Assignee: MTU Friedrichshafen GmbH, Friedrichshafen, Fed. Rep. of Germany

[21] Appl. No.: 458,678
[22] PCT Filed: May 16, 1989
[86] PCT No.: PCT/EP89/00529
§ 371 Date: Mar. 5, 1990
§ 102(e) Date: Mar. 5, 1990
[87] PCT Pub. No.: WO89/11599
PCT Pub. Date: Nov. 30, 1989

[30] Foreign Application Priority Data

May 28, 1988 [DE] Fed. Rep. of Germany ....... 3818239

[51] Int. Cl.$^5$ ..................... F16D 13/68; F16D 13/52
[52] U.S. Cl. ................... 192/70.2; 192/70.16
[58] Field of Search ................ 192/70.2, 70.19, 70.16

[56] References Cited

U.S. PATENT DOCUMENTS

| 1,328,022 | 1/1920 | Watson | 192/70.2 X |
| 3,621,945 | 11/1971 | Spry | 192/70.2 X |
| 3,841,452 | 10/1974 | Newsock et al. | 192/70.2 X |
| 4,534,457 | 8/1985 | Eltze et al. | 192/70.2 |

FOREIGN PATENT DOCUMENTS

| 681145 | 8/1939 | Fed. Rep. of Germany ... | 192/70.19 |
| 705117 | 4/1941 | Fed. Rep. of Germany . | |
| 740464 | 10/1943 | Fed. Rep. of Germany . | |
| 3322412 | 1/1985 | Fed. Rep. of Germany ..... | 192/70.2 |
| 348386 | 4/1905 | France . | |
| 2154056 | 5/1973 | France . | |
| 152528 | 11/1920 | United Kingdom . | |

Primary Examiner—Rodney H. Bonck
Assistant Examiner—Andrea Pitts
Attorney, Agent, or Firm—Barnes & Thornburg

[57] ABSTRACT

The invention relates to a multi-disk friction clutch in which the teeth of the external disks are constructed with undercut tooth profiles. Under the influence of a resulting centrifugal force acting in the center of gravity, the external disks which, with play are fitted into their outer guide, slide into an eccentric position in which they are supported on their circumference in the guide. For geometrical reasons, tooth profiles which are in a normal position with respect to the direction of the force or in shifting direction, come to rest sooner in and against the guide than obliquely extending tooth profiles. In the case of undercut teeth of the external disk, the supporting tooth profiles, viewed in the direction of the force, are disposed in front of the point of application of the force. As a result, in the case of a suitably adapted play with smaller gaps between the tooth profiles of the toothing of the exernal disks and of the outside guide than between other points of the outer contour and the outer guide, a stable support of the external disks is obtained in which the oblique positions are reset automatically. Because therefore a straightening of the external disks is ensured, they cannot cause a wobbling of the rotating internal disks.

2 Claims, 1 Drawing Sheet

MULTI-DISK FRICTION CLUTCH

The invention relates to a multi-disk friction clutch having an outer body with grooves for the guiding of external disks by means of their toothing, as well as having a hub body with grooves for the guiding of internal disks by means of their toothing, the external and internal disks resting in and against their guides with play. Such a clutch is disclosed, for example, in DE-PS 26 01 507.

In the case of the multi-disk friction clutch disclosed in the initially mentioned text, the toothings of the external and internal disks, which engage in grooves of an outer body and of a hub body of the clutch, are constructed to be V-shaped and have teeth which taper toward the tip of the tooth. For tolerance reasons and because, when the clutch is operated, the axial shifting of the disks must take place while the displacement resistance is low, a sufficient radial play of the disks must be provided which ensures the axial shiftability of the disks also in the case of occurring strong temperature fluctuations and small oblique positions. In the released condition of the clutch, thus when the external and internal disks are at an axial distance from one another, an uncontrolled wobbling of the disks is observed. The reason is that, because of a force acting in the center of gravity and because of the gap between a disk and its guide when the support is instable, individual external disks take up an inclined position and push against the oppositely rotating internal disks. In order to achieve a clean separation of the disks while the clutch is released, it was suggested to provide spacing elements between the disks which keep the disks apart. Nevertheless, even this measure, does not always ensure that the desired parallel position of the disks is obtained.

The invention is based on the object of preventing the wobbling of the disks.

In the case of a device of the mentioned type, this object is achieved according to preferred embodiments of the invention by providing an arrangement characterized in that the teeth of the external disks are constructed with undercut tooth profiles, in that the grooves in the outer body have corresponding undercuts, and in that the external disks are constructed such that, when the external disks are arranged centrically in the outer body, the gap between the external disks and the outer body at the tooth profiles caused by the play is smaller than at the other points of the outer contour of the external disks. Because of asymmetries, resulting centrifugal forces which are applied to the center of gravity affect the rotating external disks. Because of the required gap between the external disks and their guide in the outer body, the external disks, when the clutch is released, under the effect of these forces, slide into a slightly eccentric position in which they are supported in their guide. In this case, if the support is unstable, as in the state of the art, the external disks would tilt and therefore take up an undesirable oblique position. An unstable support exists when the supporting points at the disks, viewed in the direction of the force or the shifting, are located behind the point of application of force or the center of gravity. When the support is unstable, a slightly oblique position causes a tilting moment which increases the oblique position. When the teeth of the external disk are constructed with undercut tooth profiles according to the invention, a stable "suspended" support of the external disk is achieved. When disks take up an oblique position, a resetting moment occurs which cancels the oblique position. The supporting of the external disks takes place at tooth profiles of teeth which, viewed in force direction, are located in front of the center of gravity of the disks. The reason is that, for geometrical reasons, tooth profiles which are in a normal position with respect to the force direction or shifting direction come to rest in the guide at the outer body earlier than tooth profiles disposed obliquely with respect to it or other edges of the contour of the external disks, and tooth Profiles which are suitable for a stable support with a normal alignment with respect to the force direction are found only at teeth with undercut tooth profiles. In order to ensure that, in the guide, the external disks come to rest against the tooth profiles and not at other points of the contour located in a normal position with respect to the force direction, such as surfaces of the tip of the tooth and of the base of the tooth, the outer contour of the external disks must be constructed such that the gap between the external disks and the outer body is the smallest when the the external disks are in a centric position at the tooth profiles. By constructing the toothing of the external disks with undercut tooth profiles and by correspondingly constructing the receiving grooves with undercuts, it is therefore prevented that the external disks take up an oblique position. However, when the external disks are straightened, an abutting of the internal disks and a resulting gyroscopic movement of the internal disks with the resulting wobbling of the rotating internal disks is avoided.

An embodiment of the invention is shown in the drawings and will be described in detail in the following.

Figure 1:
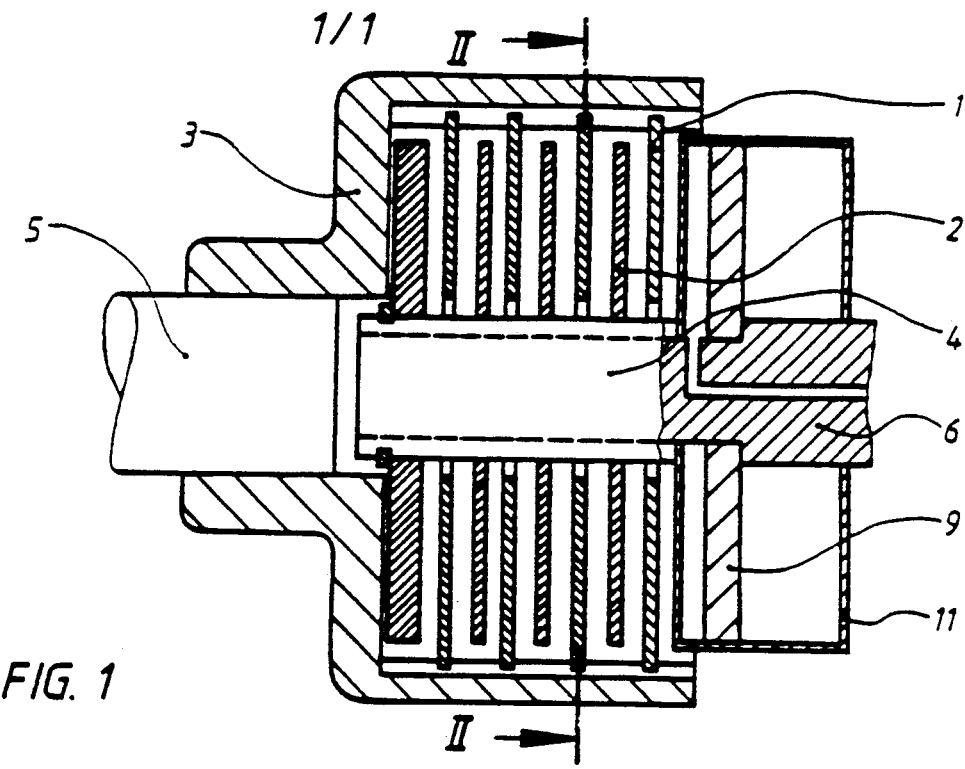
FIG. 1 is a longitudinal sectional view of a multi-disk friction clutch.
Figure 2:
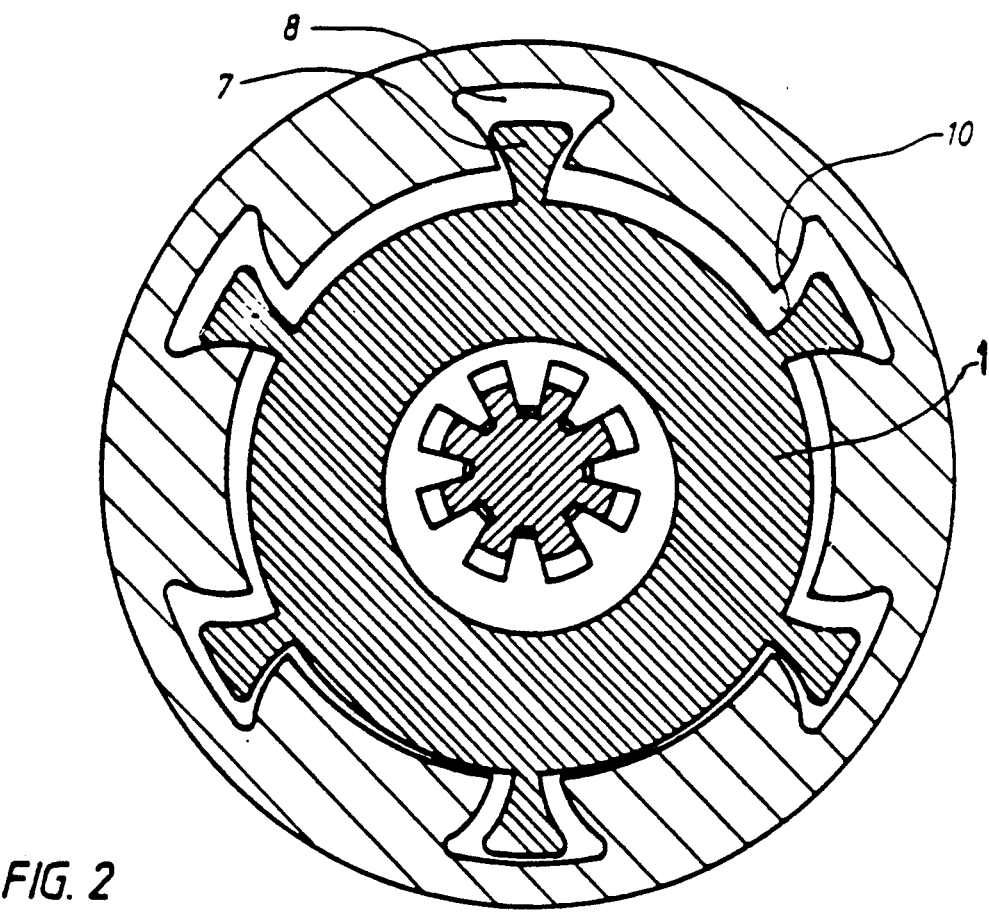
FIG. 2 is a cross-sectional view of the multi-disk friction clutch along intersecting line II-II in FIG. 1.

In the multi-disk friction clutch shown in longitudinal sectional view in FIG. 1, the external disks 1, by means of a toothing, are coupled with an outer body 3 which is connected with a shaft 5. The internal disks 2, by means of a toothing, are coupled with a hub body 4 which is connected with a shaft 6. In this case, a thrust collar 9 with a hydraulic cylinder 11 is used for actuating the clutch. When the clutch is released, the axially shiftable disks will move to equal distances from one another. Elastic spacing elements, which are not shown and which are disposed, for example, between the disks, are used for separating the disks. FIG. 2, which represents a sectional view of the multi-disk friction clutch along intersecting line II shown in FIG. 1, shows an external disk 1. The external disk 1 has teeth 7 with undercut, bent tooth profiles 10 the teeth 7 may also have straight tooth profiles, which engage in grooves 8 with corresponding undercuts in the outer body 3. The external disk 1 shown in FIG. 2 is shown in a position which it would reach as a result of the force applied in the center of gravity. Because of the force, the external disk 1 hangs at the undercut tooth profiles 10 of teeth 7 which, viewed in the direction of the force, are situated in front of the center of gravity, the point of application of the force. The play 8 between the external disk and the guide in the outer body 3, which is represented by gaps, is drawn in an exaggerated manner in order to provide a better impression of the off-center position of the external disk 1 because of the acting forces. Because of the hanging support of the external disk 1, it is ensured that the external disk 1 adjusts itself in a straight position. For geometrical reasons, profile areas of the external disk 1 disposed in a normal position with respect to the direction of force or the shifting direction come to rest at the guide in the outer body 3 earlier than obliquely extending profile areas. In the case of undercut teeth 7, tooth profiles 10, which are suitable for use as the support and are in a normal position, are situated, viewed in the direction of the force, in front of the center of gravity—the center of the disks—, so that the shown stable "suspended" support is obtained, in which oblique positions, as a result of the effect of the forces applied to the center of gravity, are eliminated by a resetting moment. However, it must be ensured that the gap between the external disk 1 and the outer body 3 is constructed to be smaller when the external disk 1 is in a centric position at the tooth profiles 10 than at the other points of the outer contour of the external disk 1. As a result, it is avoided that the external disks may come to rest at the guide, for example, at areas of the tip of the tooth and the base of the tooth which are also in a normal position with respect to the shifting direction. A tilting and thus an oblique position of the external disk 1 could only occur if the supports of the external disks were to lie behind the center of gravity in the direction of the force. Since this is impossible and it is therefore ensured that external disks 1 cannot reach an oblique position, it is also ensured that the external disks 1 do not push against the internal disks 2 and therefore set them into a gyroscopic motion, whereby the internal disks 2 are caused to carry out a wobbling motion. A more stable support of the external disks is achieved by additionally widening the radial outward edge of the teeth 7 on the external disks 1 as compared to the width of the teeth 7 at their radially inward root section. This broadens the supporting base. By assigning the teeth only to each second receiving groove in the outer body 3 and by arranging the successive external disks 1 offset by one tooth, a particularly broad toothing can be constructed. As a result, the width of the toothing can become twice as large as previously.

I claim:

1. A multi-disk friction clutch having an outer body with grooves for the guiding of external disks by means of their toothing, as well as having a hub body with grooves for the guiding of internal disks by means of their toothing, the external and internal disks resting in and against their guides with play, characterized in that the teeth of the external disks are constructed with undercut tooth profiles, in that the grooves in the outer body have corresponding undercuts, and in that the external disks are constructed such that, when the external disks are arranged centrically in the outer body, the gap between the external disks and the outer body at the tooth profiles caused by the play is smaller than at the other points of the outer contour of the external disks.

2. A multi-disk friction clutch according to claim 1, characterized in that the external disks are additionally widened in the area of the toothed ring with respect to the disk body.

* * * * *